US011139472B2

(12) United States Patent
Han et al.

(10) Patent No.: US 11,139,472 B2
(45) Date of Patent: Oct. 5, 2021

(54) INORGANIC CONDUCTIVE LAYERS FOR ELECTROCHEMICAL CELLS

(71) Applicant: GRU Energy Lab Inc., San Jose, CA (US)

(72) Inventors: Song Han, Foster City, CA (US); Sa Zhou, San Jose, CA (US); Xiaohua Liu, Mountain View, CA (US); Xinghua Meng, San Jose, CA (US)

(73) Assignee: GRU ENERGY LAB INC., San Jose, CA (US)

( * ) Notice: Subject to any disclaimer, the term of this patent is extended or adjusted under 35 U.S.C. 154(b) by 177 days.

(21) Appl. No.: 16/514,953

(22) Filed: Jul. 17, 2019

(65) Prior Publication Data

US 2020/0036001 A1    Jan. 30, 2020

Related U.S. Application Data

(60) Provisional application No. 62/703,049, filed on Jul. 25, 2018.

(51) Int. Cl.
*H01M 4/36* (2006.01)
*H01M 4/62* (2006.01)
*H01M 4/58* (2010.01)

(52) U.S. Cl.
CPC ............ *H01M 4/366* (2013.01); *H01M 4/58* (2013.01); *H01M 4/622* (2013.01); *H01M 4/624* (2013.01)

(58) Field of Classification Search
CPC ............ H01M 4/36; H01M 4/46; H01M 4/58; H01M 10/052
See application file for complete search history.

(56) References Cited

U.S. PATENT DOCUMENTS

| 8,158,254 B2 * | 4/2012 | Wang ................. C01B 33/06 428/364 |
| 2011/0236753 A1 * | 9/2011 | Kuriki ............... H01M 4/0471 429/218.1 |
| 2014/0287311 A1 | 9/2014 | Wang et al. |
| 2014/0295268 A1 * | 10/2014 | Wang .................. H01M 4/366 429/218.1 |

(Continued)

FOREIGN PATENT DOCUMENTS

JP       2017-224538 A1 * 12/2017 ............. H01M 4/38

*Primary Examiner* — Kenneth J Douyette
(74) *Attorney, Agent, or Firm* — Kwan & Olynick LLP

(57) ABSTRACT

Provided are electrodes for use in electrochemical cells and active material components used to form these electrodes. Also provided are methods of forming these active material components as well as methods of forming these electrodes. An electrode comprises a current collector and an active layer, comprising active material structures and an inorganic conductive layer. The inorganic conductive layer coats and binds together these active material structures. Furthermore, the inorganic conductive layer also provides adhesion of the active layer to the current collector. The inorganic conductive layer has an electronic conductivity of at least $10^4$ S/m and provides an electronic path among the active material structures and, in some examples, between the active material structures and the current collector. In some embodiments, the same inorganic conductive layer shared by multiple active material structures.

20 Claims, 8 Drawing Sheets

(56) References Cited

U.S. PATENT DOCUMENTS

2015/0024289 A1* 1/2015 Wang .................. H01M 4/8825
  429/405
2015/0155556 A1* 6/2015 Kawakami ............ H01M 4/366
  252/182.1

* cited by examiner

INORGANIC CONDUCTIVE LAYERS FOR ELECTROCHEMICAL CELLS

CROSS-REFERENCE TO RELATED APPLICATIONS

This application claims the benefit under 35 U.S.C. § 119(e) of U.S. Provisional Patent Application No. 62/703,049, entitled: "Inorganic Conductive Layers for Electrochemical Cells", filed on 2018Jul. 25, which is incorporated herein by reference in its entirety for all purposes.

TECHNICAL FIELD

The present disclosure relates generally to inorganic conductive layer binders for electrochemical cells or, more specifically, to electrodes and active material components comprising inorganic conductive layers disposed over active material structures and which may be operable as conductive binders.

BACKGROUND

Conventional battery electrodes, such as electrodes in lithium ion batteries, comprise various combinations of polymeric binders and conductive additives, in addition to active materials, in their active layers. These polymeric binders provide support to the active materials and, in some examples, conductive additives with the active layers. Furthermore, these binders are used for adhesion of entire electrode layers to current collectors, such as metal foils. However, conventional polymeric binders are not electronically conductive. Most polymeric binders have an electronic conductivity of less than $10^3$ S/m. As a result, conductive additives, such as acetylene black, carbon fibers or carbon nanotubes, are added to electrode layers to provide electronic pathways with these layers and to the current collectors. However, each additional component adds to cell's weight and/or volume, resulting in lower gravimetric and volumetric capacities. Furthermore, polymeric binders tend to have poor adhesion to active materials and/or to current collectors within the electrode layer. This limited adhesion often results in capacity fade during cycling of the battery.

What is needed are novel inorganic conductive layers, operable as conductive binders for electrodes of electrochemical cells, which may partially or completely eliminate the need for conductive additives and may provide stronger adhesion to active materials and/or current collectors than current conventional polymer binders.

SUMMARY

Provided are electrodes for use in electrochemical cells and active material components used to form these electrodes. Also provided are methods of forming these active material components as well as methods of forming these electrodes. An electrode comprises a current collector and an active layer, comprising active material structures and an inorganic conductive layer. The inorganic conductive layer coats and binds together these active material structures. Furthermore, the inorganic conductive layer also provides adhesion of the active layer to the current collector. The inorganic conductive layer has an electronic conductivity of at least $10^4$ S/m and provides an electronic path among the active material structures and, in some examples, between the active material structures and the current collector. In some embodiments, the same inorganic conductive layer shared by multiple active material structures.

Provided is an electrode for use in an electrochemical cell. In some examples, the electrode comprises a current collector and an active layer, directly interfacing and disposed on the current collector. The active layer comprises active material structures and an inorganic conductive layer, coating and binding together the active material structures. The inorganic conductive layer has an electronic conductivity of greater than $10^4$ S/m and provides an electronic path among the active material structures.

In some examples, the inorganic conductive layer comprises one of a silicide selected from the group consisting of nickel silicide, titanium silicide, copper silicide, iron silicide, molybdenum silicide, zirconium silicide, manganese silicide, magnesium silicide, tin silicide, platinum silicide, and calcium silicide. Alternatively, the inorganic conductive layer comprises a semi-liquid metal. In some examples, the active material structures comprises a material selected from the group Li, Si, Sn, Ge, Al, SnO2, TiO2, and $TiSi_2$(C49). For example, the active material structures comprise $TiSi_2$ (C49), while the inorganic conductive layer comprises $TiSi_2$ (C54).

In some examples, the inorganic conductive layer directly interfaces the current collector and provides an electronic path between the active material structures and the current collector. More specifically, the inorganic conductive layer and the current collector may be connected with chemical bonds. Furthermore, the inorganic conductive layer may adhere the active material structures to the current collector. In some examples, the active layer further comprises a conductive additive and/or a polymer binder.

Also provided is an active material component, for forming an electrode of an electrochemical cell. In some examples, the active material component comprises an active material structure and an inorganic conductive layer, coating and binding together the active material structure. The inorganic conductive layer has an electronic conductivity of greater than $10^4$ S/m and provides an electronic path to and from the active material structures.

In some examples, the active material component is a standalone component, forming a powder with other active material components. The inorganic conductive layer fully covers a surface of the active material structure. The inorganic conductive layer may be conformal. In some examples, the inorganic conductive layer comprises one of a silicide selected from the group consisting of nickel silicide, titanium silicide, copper silicide, iron silicide, molybdenum silicide, zirconium silicide, manganese silicide, magnesium silicide, tin silicide, platinum silicide, and calcium silicide.

Also provided is a method of forming an active material component. In some examples, the method comprises providing an active material structure, comprising a surface. The method comprises forming an inorganic conductive layer on at least a portion of the surface of the active material structure. The inorganic conductive layer has an electronic conductivity of greater than $10^4$ S/m and provides an electronic path to and from the active material structures.

In some examples, forming the inorganic conductive layer comprises forming a metal layer in a surface of the active material structure and annealing a formed combination of the active material structure with the metal layer. Alternatively, forming the inorganic conductive layer may comprise soaking the active material structure in a metal containing solution. Furthermore, forming the inorganic conductive layer may comprise mechanical annealing. In some examples, the active material component is a standalone component, forming a powder with other active material components.

DETAILED DESCRIPTION

Figure 1A:
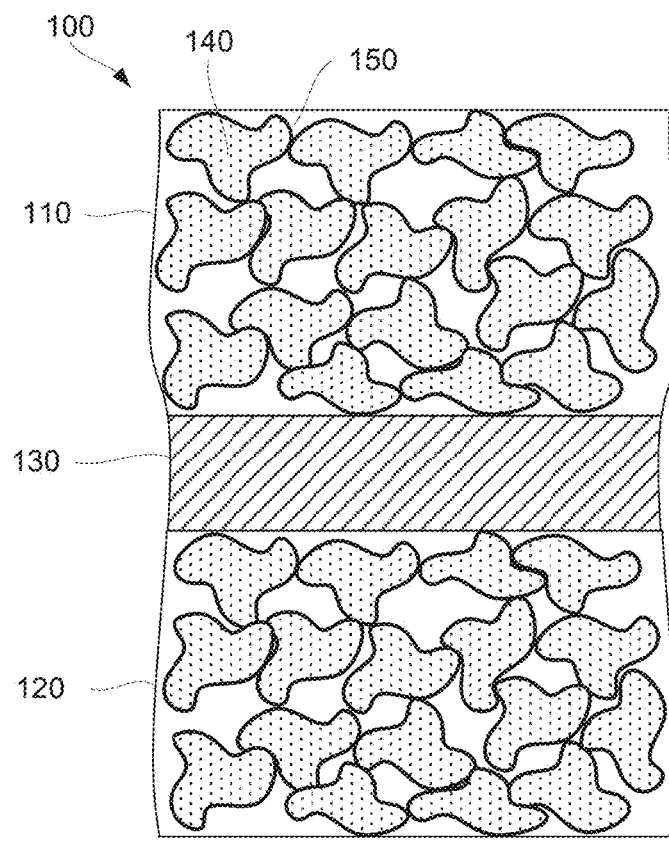
FIG. 1A is a schematic cross-sectional view of an electrode portion, showing a current collector and two active layers, each active layer comprising active material structures and an inorganic conductive layer, coating the active material structures and interfacing with the current collector, in accordance with some examples.

In the following description, numerous specific details are set forth in order to provide a thorough understanding of the present invention. The present invention may be practiced without some or all of these specific details. In other instances, well known process operations have not been described in details to avoid obscuring the present invention. While the invention will be described in conjunction with the specific examples, it will be understood that it is not intended to limit the invention to the examples.
Introduction Provided are various examples of electrodes for electrochemical cells and active material components for forming these electrodes. An electrode comprises multiple active material structures and one or more inorganic conductive layers, disposed on and at least partially coating the active material structures. An inorganic conductive layer provides electronic pathways among active material structures, which this inorganic conductive layer contacts. For example, a continuous (monolithic) may cover multiple active material structures.

In some examples, the inorganic conductive layer also provides electronic pathways between the active material structures and the conductive substrate. This conductive path is important to ensure that all active material structures operate at substantially the same voltage and experience the same electrochemical cycling conditions (e.g., state of charge and discharge).

Furthermore, the inorganic conductive layer may be operable as a binder in an electrode and may support the active material structures relative to each other, in some examples, relative to the conductive substrate. It should be noted that some active material structures may change shape and/or size during cycling. As such, inorganic conductive layers may be also referred to as conductive binders.

Inorganic conductive layers may be used with various active materials, such as silicon (Si) and silicon oxide (SiO), Sn (tin), $TiO_2$ (titanium dioxide), and the like. For example, silicon has been sought to substitute graphite, which is currently the main negative active material in lithium ion cells. Silicon has a high capacity but experiences large volume changes during lithiation/cycling, which in turn causes capacity fading. In particular, these volume changes may cause silicon structures to lose electrical connections with other components in the electrode active layer (e.g., other silicon structures) and/or with the current collector. Conventional polymer binders generally fail to provide sufficient support to silicon structures in active layers during such volume changes. After some initial cycling, silicon structures become electrically isolated from current collectors and do not participate in further ionic exchange, resulting in capacity fade. Furthermore, conventional polymer binders have a poor electronic conductivity, requiring addition of conductive additives to electrodes. This, in turn, reduces volumetric and gravimetric capacity of the electrodes and electrochemical cells formed from these electrodes.

Inorganic conductive layers, described herein, have a high electronic conductivity, e.g., at least $10^4$ S/m, which is at least 10, 100, or even 1000 greater than that of most polymer binders. Furthermore, inorganic conductive layers can provide a strong mechanical framework, maintaining their integrity as well as electrode's integrity during swelling and contraction of active material structures, experienced during cycling. Yet another aspect of inorganic conductive layers is their electrolyte stability and ability to isolate active material structures from electrolytes. Specifically, an inorganic conductive layer may coat (partially or fully) the surface of active material structures and provide ionic transport between the coated active material structures and the electrolyte. The inorganic conductive layer prevents formation of undesirable electrolyte interface layers as well as electrolyte decomposition and lithium consumption.
Examples of Electrodes and Active Material Components Comprising Inorganic Conductive Layers FIG. 1A is a schematic illustration of electrode 100, comprising current collector 130 and active layer 110. Electrode 100 may be used in an electrochemical cell, some examples of which are described below with reference to FIG. 4. The material of current collector 130 depends on the electrochemical operating potential of electrode 100. Current collector 130 materials may include copper and/or copper dendrite coated metal oxides, stainless steel, titanium, aluminum, nickel, chromium, tungsten, metal nitrides, metal carbides, carbon, carbon fiber, graphite, graphene, carbon mesh, conductive polymers, or combinations of above including multi-layer and/or composite structures. Current collector 130 may be formed as a foil, films, mesh, metallic foam laminate, wires, tubes, particles, multi-layer structure, or any other suitable configurations. In one example, current collector 130 is a stainless steel foil having thickness of between about 1 micrometer and 50 micrometers. In other examples, current collector 130 is a copper foil with thickness of between about 5 micrometers and 30 micrometers. In yet another example, current collector 130 is an aluminum foil with thickness of between about 5 micrometers and 50 micrometers.

As shown in FIG. 1A, active layers 110 directly interface and are disposed on current collector 130 or, more specifically, active layers 110 are adhered to current collector 130, [Vlad to replace 120 with 110 in FIG. 1A] While FIG. 1A illustrates two active layers 110 disposed on opposite sides of current collector 130, one having ordinary skilled in the art that electrode 100 may include only one active layer 110 disposed on one side of current collector 130. The other side of current collector 130 may be exposed or covered with another component, e.g., an insulator. For brevity, future reference will be made to active layer 110 in a singular form.

Current collector 130 may provide mechanical support to active layer 110. In some examples, the surface of current collector 130 is functionalized to enhance adhesion of active layer 110 to current collector 130. Furthermore, current collector 130 may operate as an electrical conductor between active layer 110 and other components of an electrochemical cell (e.g., a tab, case). The thickness of current collector 130 may be selected on the current ratings of electrode 100 (e.g., 1C, 10C) and the amount of active materials in active layer 110.

Figure 1B:
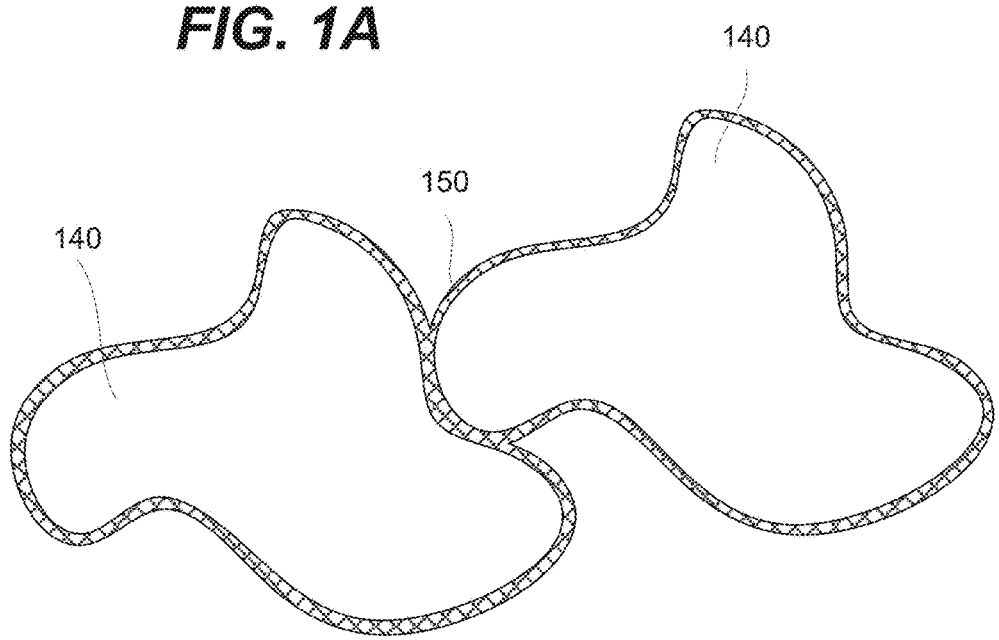
FIG. 1B is a schematic cross-sectional view of two active material structures and an inorganic conductive layer of the electrode in FIG. 1A, in accordance with some examples.

Active layer 110 comprises active material structures 140 and one or more inorganic conductive layers 150. For brevity, the reference will be made to inorganic conductive layer 150 in a singular form. One having ordinary skill in the art would understand that inorganic conductive layer 150 may be a single monolithic structure, a collection of disjoined structures spread over active material structures 140, and the like. When incorporated into active layer 110, a single continuous inorganic conductive layer 150 may coat multiple active material structures 140 and may bind these multiple structures together as, for example, schematically shown in FIG. 1B. Furthermore, inorganic conductive layer 150 has an electronic conductivity of greater than $10^4$ S/m or, more specifically, greater than $10^5$ S/m or even greater than $10^6$ S/m. Inorganic conductive layer 150 provides an electronic path among active material structures 140 of active layer 110 and, in some examples, between active material structures 140 and current collector 130.

Figure 2A:
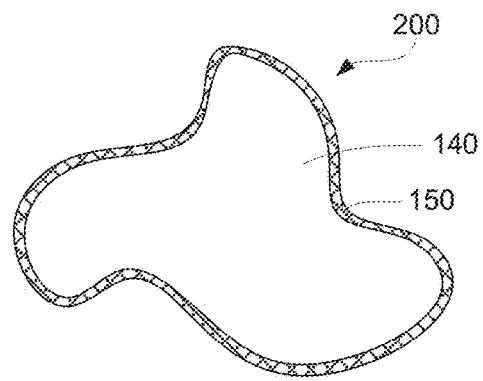
FIGS. 2A-2E illustrates different examples of an active material component, used for forming an electrode of an electrochemical cell and comprising active material structures and inorganic conductive layers.
Figure 2B:
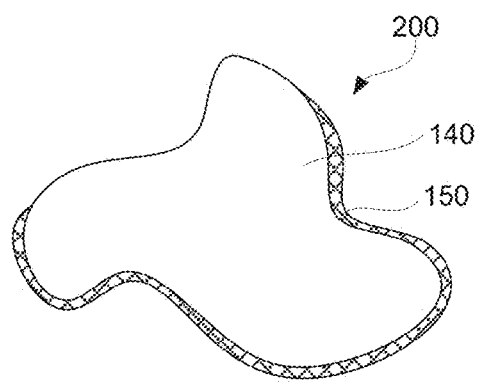
Figure 2C:
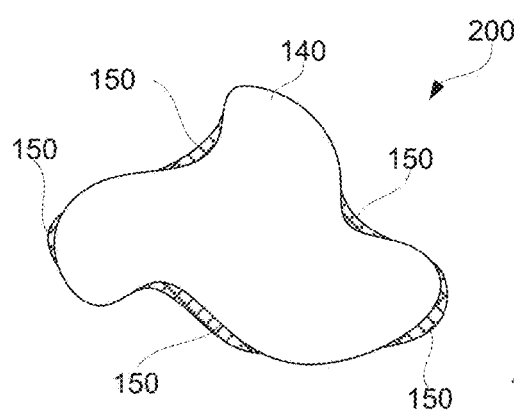

It should be noted that a combination of individual active material structure 140 (or a cluster of several active material structures 140) and inorganic conductive layer 150 may exist prior to forming active layer 110. This combination of one or more active material structures 140 and inorganic conductive layer 150 may be referred to as active material component 200. Active material component 200 may exist as a standalone component prior to forming electrode 100, e.g., in a powder form. Active material component 200 is an integrated physical unit, e.g., a particle, flake, or wire. Various examples of active material component 200 are shown in FIGS. 2A-2C and described below. Alternatively, inorganic conductive layer 150 is deposited over active material structure 140 while forming electrode 100 or, more specifically, while forming active layer 110 of electrode 100. In these examples, active material components 200 are not separately formed. These examples are further described below with reference to FIGS. 3A and 3B.

In some examples, inorganic conductive layer 150 comprises or consisting essentially of a silicide or, more specifically, a metal silicide. For purposes of this disclosure, the term "consisting essentially of" is defined as a molar ratio of at least about 95% or even at least about 98%. Some examples of silicides include, but are not limited, to nickel silicide, titanium silicide, copper silicide, iron silicide, molybdenum silicide, zirconium silicide, manganese silicide, magnesium silicide, tin silicide, platinum silicide, vanadium silicide, chromium silicide, and calcium silicide. A particular silicide is selected for its conductivity, low molar mass, and conformality of coating on the active particles. For example, titanium silicide may be used because it is highly conductive (~$10^6$ S/m) and can form coherent interface with the silicon active materials through a self-aligned silicide formation process.

Silicides are highly conductive or at least much more conductive than conventional polymer binders. For example, PVDF is an insulator with a volume resistivity of 5-14×$10^{15}$ Ohm-cm. Furthermore, silicides are mechanically strong and may be used to constrain active material structures 140 during ion insertion and removal (e.g., lithiation and delithiation in lithium ion cells). This feature may be used to reduce/control volume changes (e.g., directions of expansion and contraction) and to preserve integrity of active layers. The electrical connections within the active layers are preserved as a result of this mechanical constraining function of the silicides used in inorganic conductive layer 150.

Silicides are also capable of forming chemical bonds (e.g., covalent bonds) with some materials of active material structures 140 (e.g., silicon) and/or with current collector 130. Chemical bonds are a lot stronger than conventional hydrogen or van der Waals bonds typical for polymer binders. Specifically, when forming inorganic conductive layer 150, metal elements of a precursor can react with silicon of active material structures 140 and form the silicide of inorganic conductive layer 150. This silicide may be covalently bound to silicon of active material structures 140. Furthermore, silicides have high chemical stability, especially when compared with polymeric hinders. For instance, PVDF may swell upon contact with some solvents in the electrolyte, resulting in separation of active articles in the electrode and increased resistance. In contrast, inorganic binders do not uptake solvents or undergo structural changes upon contact with the solvent molecules. Replacing conventional binders with inorganic binders helps with maintaining electrode integrity.

It should be noted that some silicides are also electrochemically active. For example, $TiSi_2$ has a capacity of around 900 mAh/g. As such, a combination of the silicide in inorganic conductive layer 150 and silicon (and/or another active material) in active material structures 140 can be specific selected to achieve a desired total capacity, conductivity, volume expansion, and other characteristics, e.g., to allow higher structural integrity during cycling. An inorganic shell with a specific capacity may provide a buffer to mitigate the abrupt difference of volumetric changes between active materials and inactive components. This features results in overall improvement of structural integrity. In some examples, an inorganic shell serves as lithiu, reservoir to balance the inhomogeneous distribution of lithium during cycling, thus leading to a more stable cycling.

In some examples, inorganic conductive layer 150 comprises a semi-liquid metal. For purposes of this disclosure, a semi-liquid metal is defined as a metal that has a melting point around the room temperature (~20° C.) and maintains its shape without applying external forces yet capable of deforming freely without cracking. Some examples of semi-liquid metals suitable for inorganic conductive layer 150 include, but are not limited to, gallium-indium eutectic. A semi-liquid metal may easily follow the volumetric changes of the active particles, maintain good contact with the active particles, and, in some examples, heal the cracks in the active particles. This type of inorganic hinder can heal or undergo a solid-liquid-solid phase transformation through a well-controlled heat treatment to restore good contact and binding with the active particles.

The semi-liquid metal of inorganic conductive layer 150 may be operable as internal electrode fuse controlling electrical connections of active material structures 140 among each other and current collector 130. For example, the semi-liquid metal may soften at a certain temperature (e.g., during local current concentrations) and allow for some active material structures 140 to disconnect thereby reducing electronic flow and preventing potentially unsafe conditions (e.g., thermal runaways).

In some examples, inorganic conductive layer 150 has a thickness of between about 0.001 micrometers and 500 micrometers or, more specifically, between about 0.01 micrometers and 100 micrometers or between about 0.1 micrometers and 50 micrometers. Greater thickness provides more electronic conductivity and mechanical support but has a negative impact on at least the gravimetric capacity. In some examples, inorganic conductive layer 150 is substantially conformal, when disposed over active material structures 140. For purposes of this disclosure, substantially conformal is defined as variation in thickness of less than 25% of the average for each standard deviation. In some examples, inorganic conductive layer 150 partially fills the imps between active material structures 140 to provide sufficient binding, yet allow electrolyte to penetrate in the spaces between active material structures 140, thereby allowing uniform electrolyte wetting of active material structures 140.

Active material structures 140 may comprise silicon, lithium, tin, germanium, aluminum, tin oxide, titanium oxide, titanium silicide $TiSi_2$ (C49), and the like Si, Si-alloys, Sn, $SnO_2$, and Ge are some examples of non-layered active materials, which may be used for active material structures 140. Graphite, graphene, $WS_2$, $MoS_2$, BN, $V_2O_{5-x}$, $NiCl_2$, $NbS_2$, $ZrS_2$, $TiSi_2$, $TiS_2$, $MoSe_2$, $SnS_2$, $VS_2$, $HfS_2$, $WSe_2$, $TiO_2$, $Li_4Ti_5O_{12}$, are some examples of layered active materials, which may be used for active material structures 140. In some examples, active material structure 140 may include a combination of two layered active materials. Lithiated variations of the above-listed materials are also within the scope.

Active material structure 140 may take various shapes, such as a particle, a wire, a tube, a net, a sheet, a flake, a needle, a sphere, a belt, a hollow structure, a core-shell, or a yolk-shell, Particles and spheres are examples of a three-dimensional object in which a ratio of any two dimensions is less than 10. Sheets and flakes are examples of a two-dimensional object in which a ratio of one dimension (thickness) to any one of the remaining two dimensions is less than 10. Finally, needles, wires, and tubes are examples of a one-dimensional object in which a ratio of one dimension (length) to any one of the remaining two dimensions is greater than 10. Three-dimensional objects may have the lowest surface area to volume ratio and may be used when the surface area needs to be minimized. Two-dimensional objects may be used as shells for other objects, provide in-plane ionic and/or electronic conductivity, and the like. One-dimensional objects may be used to provide is ionic and/or electronic conductivity along a particular dimension, e.g., away from a current collector and in some examples may contact the current collector (e.g., be substrate rooted).

The principal dimension (e.g., a diameter for a sphere-shaped particle) of active material structure 140 may be 1-20 nanometers, 1-100 nanometers, 1-500 nanometers, 1-1000 nanometers, 1-10 micrometers, 1-30 micrometers, 100-500 nanometers, 100-5000 nanometers.

In some examples, active material structure 140 comprises one or more dopants. The concentration of the dopant may be between about 0.001% molar and 2% molar. Some examples of suitable dopants include, but are not limited to, Ni, Cu, Ti, and the like. These dopants can help to reduce structure change during the ion transfer process. They can also help to improve the conductivity of active material structure 140 and help with ionic transport within these materials.

In one example, active material structures 140 may comprise $TiSi_2$ (C49), while inorganic conductive layer 150 may comprise $TiSi_2$ (C54). This combination of active material structures 140 and inorganic conductive layer 150 may be formed using a single synthesis step.

Figure 1C:
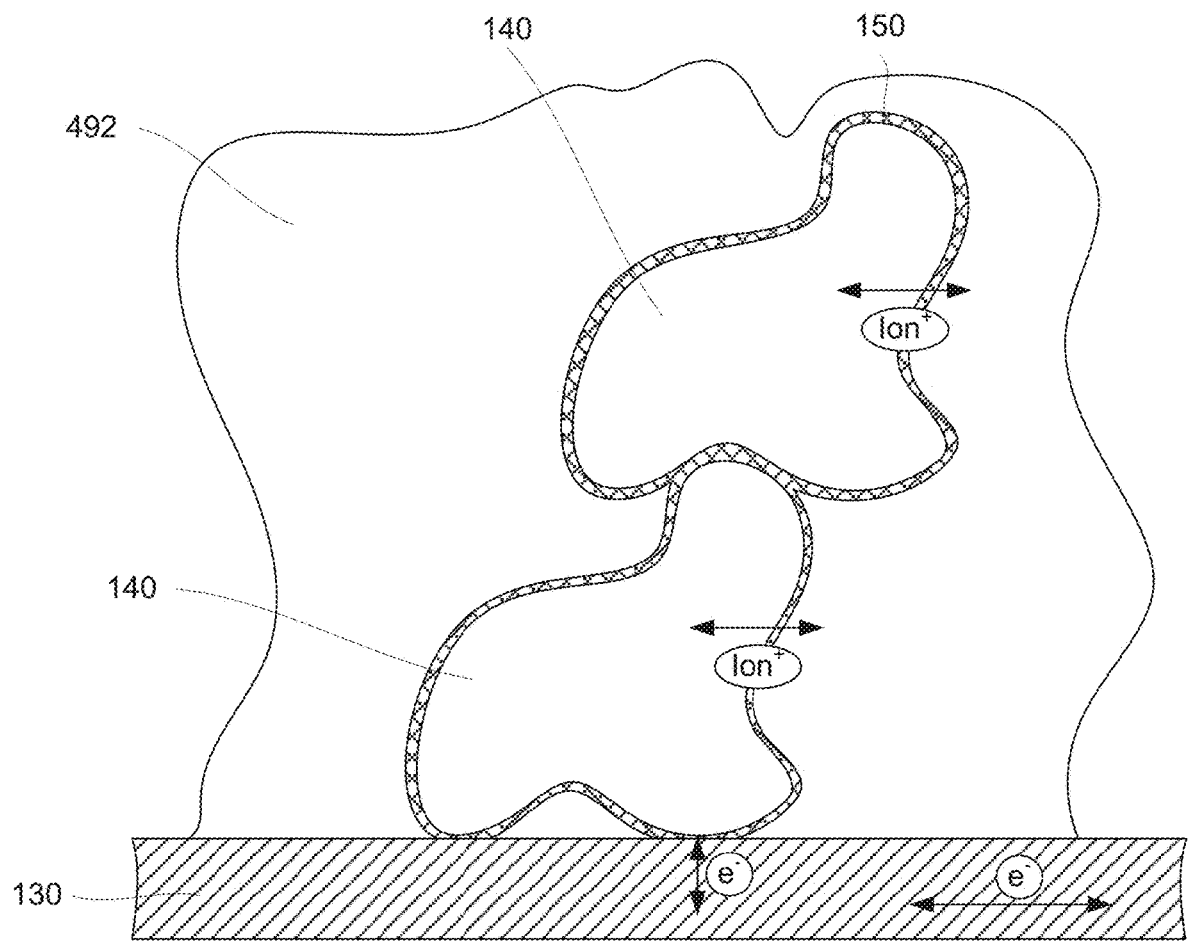
FIG. 1C is a schematic illustration of a current collector, two active material structures, and an inorganic conductive layer of the electrode in FIG. 1A, showing ionic and electronic paths between various component provided by the inorganic conductive layer.

Referring to FIG. 1C, in some examples, inorganic conductive layer 150 directly interfaces current collector 130, in addition to active material structures 140, and provides an electronic path between active material structures 140 and current collector 130. In these examples, inorganic conductive layer 150 may be used for adhering active material structures 140 to current collector 130. More specifically, inorganic conductive layer 150 and current collector 130 may be connected with chemical bonds or at least form an alloy at the interface with current collector 130.

Figure 1D:
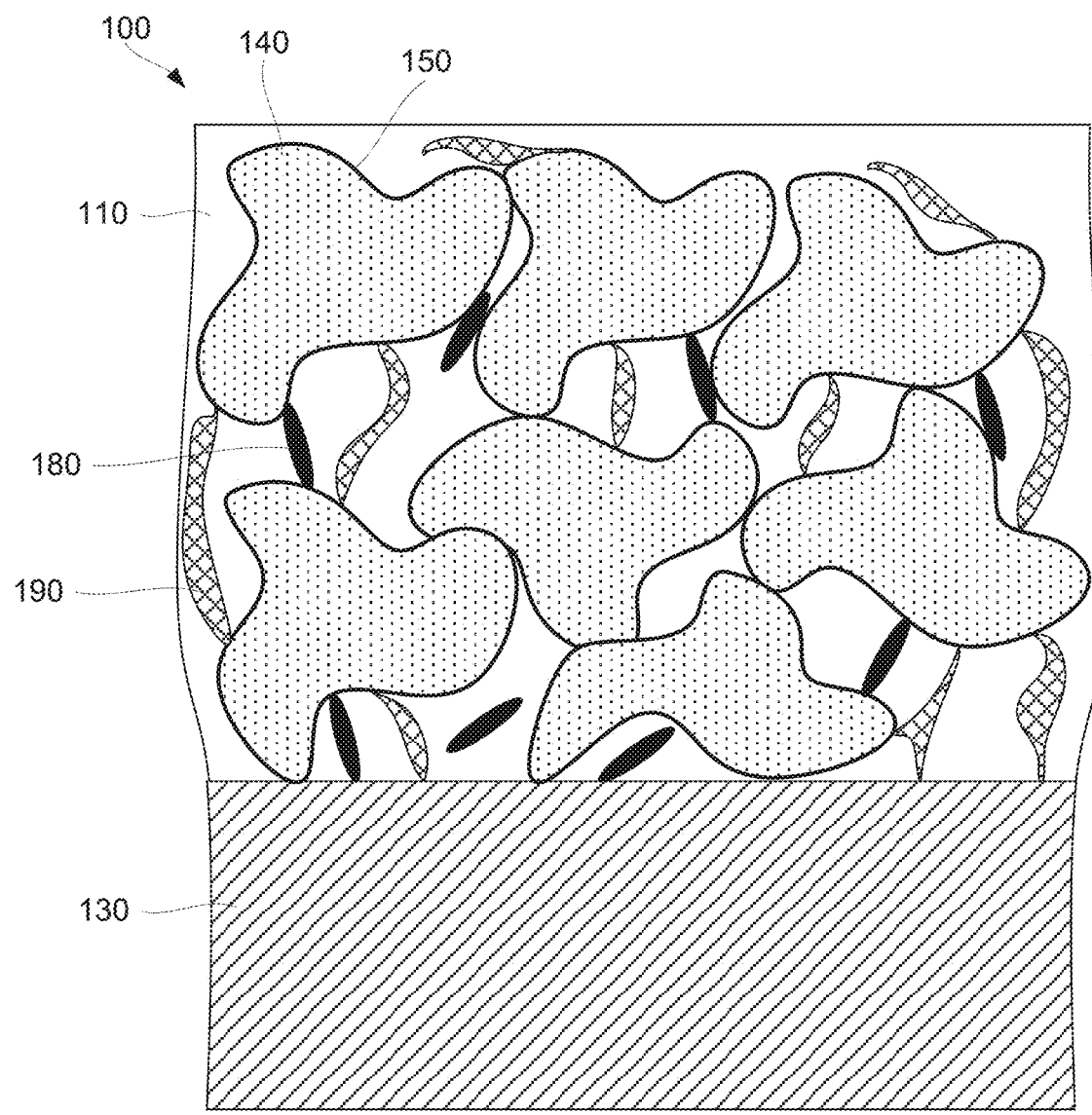
FIG. 1D is a schematic illustration of a portion of an electrode for use in an electrochemical cell, in which an active layer comprises active material structures, an inorganic conductive layer, a conductive additive, and a polymer binder, in accordance with some examples.

Referring to FIG. 1D, in some examples, active layer 110 further comprises conductive additive 180. Some examples of conductive additive 180 include, but are not limited to, acetylene black, carbon fibers and carbon nanotubes. The concentration of conductive additive 180 in active layer 110 may be substantially lower than that in conventional electrodes since inorganic conductive layer 150 is also relied for conductivity. The concentration of conductive additive 180 in active layer 110 may be less than 10% by weight or even less than 1% by weight.

Referring to FIG. 1D, in some examples, active layer 110 further comprises polymer binder 190. Some examples of polymer binder 190 include, but are not limited to, arhoxymethyl cellulose (CMC), styrene-butadiene rubber (SBR), polyacrylic acid (PAA), polyimides (PI), and poly(3,4-ethylenedioxythiophene) polystyrene sulfonate (PEDOT:PSS). The concentration of polymer binder 190 in active layer 110 may be less than 20% by weight or even less than 1% by weight.

As noted above, in some examples, active material components 200 may be formed prior to forming electrode 100. FIGS. 2A-2E illustrate different examples of active material component 200. Specifically, FIG. 2A illustrates active material component 200, comprising active material structure 140 and inorganic conductive layer 150, fully and conformally coating the surface of active material structure 140. In this example, the entire surface of active material structure 140 is covered and protected by inorganic conductive layer 150, e.g., from contacting electrolyte and forming undesirable SEI layers when active material components 200 are incorporated into an electrode and then into an electrochemical cell.

FIG. 2B illustrates another example of active material component 200, comprising active material structure 140 and inorganic conductive layer 150, only partially coating the surface of active material structure 140. The portion of the exposed surface may be less than 50% or less than 30% or even less than 10%. The partial coating may provide better electrolyte penetration to active material structure 140 and/or wetting of active material structure 140, therefore, may provide better ionic transport than, for example, a full coating described above with reference to FIG. 1A. In other words, a portion of active material structure 140 is not covered with inorganic conductive layer 150 and may remain exposed to electrolyte thereby providing direct ionic exchange with the electrolyte. At the same time, the remaining portion of active material structure 140 is protected from the electrolyte. In this example, inorganic conductive layer 150 is still conformal and monolithic. A monolithic layer, as compared to a layer with grain boundaries, may provide stronger binding and avoid degradation through fast degradation at the defective grain boundaries.

FIG. 2C illustrates active material component 200, comprising active material structure 140 and inorganic conductive layer 150. In this example, inorganic conductive layer 150 forms patches on the surface of active material structure 140, also partially coating the surface of active material structure 140. These patches may be disjoined as, for example, is shown in FIG. 2C. As with FIG. 2B example, described above, the partial coating may provide better electrolyte penetration to active material structure 140 and/or wetting of active material structure 140, therefore, may provide better ionic transport than, for example, a full coating described above with reference to FIG. 1A. This structure allows the maximal electrolyte wetting, meanwhile provides binding force to the active particles. These features are beneficial when the ionic transport into a relatively conductive active material is the rate-limiting step in an electrochemical reaction. Furthermore, a patched coating may alter the preferential electrochemical reaction sites on the active particles. As such, inorganic conductive layer 150, at least in part, controls the direction of the reaction as well as the resultant volume changes. For instance, lihitum insertion into silicon is much faster along the <110> directions than that along the <111> directions. As such, a patched coating may make the electrochemical reaction more uniform within the particle and help manage the overall volume changes.

Figure 2D:
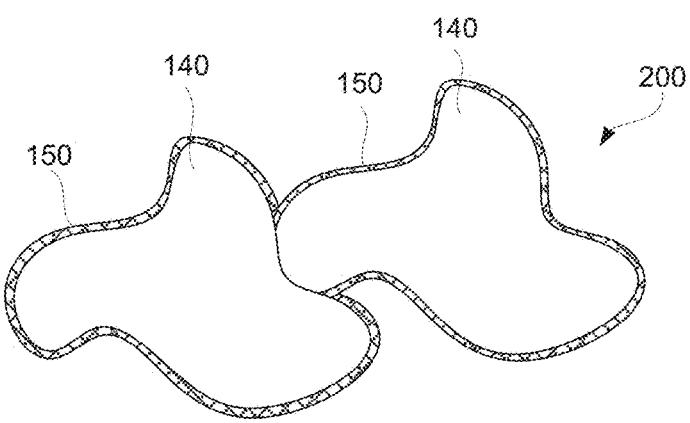

FIG. 2D illustrates another example of active material component 200, comprising two active material structures 140 and inorganic conductive layer 150, shared by these two active material structures 140. In this example, two active material structures 140 directly interfacing each other. Alternatively, inorganic conductive layer 150 may be disposed between two adjacent active material structures 140 as, for example, shown in FIG. 1B. In these examples, inorganic conductive layer 150 may provide electronic communication between two active material structures 140 and mechanically support these structures, thereby preserving the overall integrity of the active material layer.

Figure 2E:
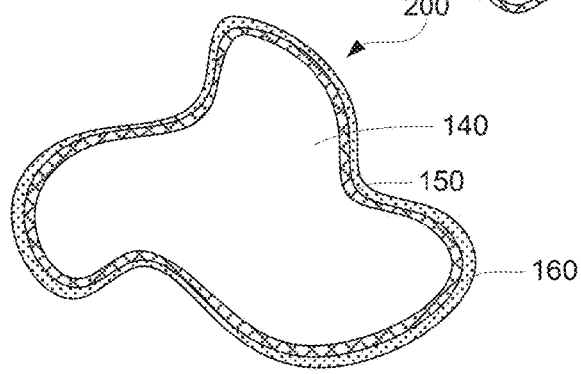

FIG. 2E illustrates yet another example of active material component 200, comprising active material structure 140, inorganic conductive layer 150, and conductive layer 160 (e.g., a carbon containing layer). In this example, conductive layer 160 forms an outer surface of active material component 200 and is disposed over inorganic conductive layer 150. In other words, inorganic conductive layer 150 is disposed between active material structure 140 and conductive layer 160. Conductive layer 160 provides additional conductivity when active material component 200 is integrated into an electrode. Furthermore, adding conductive 160 changes the interface with electrolyte, yielding more stable SEI layers. Finally, conductive layer 160 may provide stronger binding with the polymeric binder, if one is used. In some embodiments, conductive layer 160 is disposed between inorganic conductive layer 150 and active material structure 140. Conductive layer 160 may comprise or consists essentially of carbon (e.g., at least about 95% carbon by weight). Furthermore, conductive layer 160 may comprise one or more lithium-rich compounds, such as lithium-containing glass or $Li_2O$. In this example, conductive layer 160 also moderates the lithium transport between the active particles and electrolyte. In some examples, conductive layer 160 may comprise a pre-lithiation agent, such as $Li_xSi$ alloy, which compensates lithium loss in the active particles.

Examples of Methods

Figure 3A:
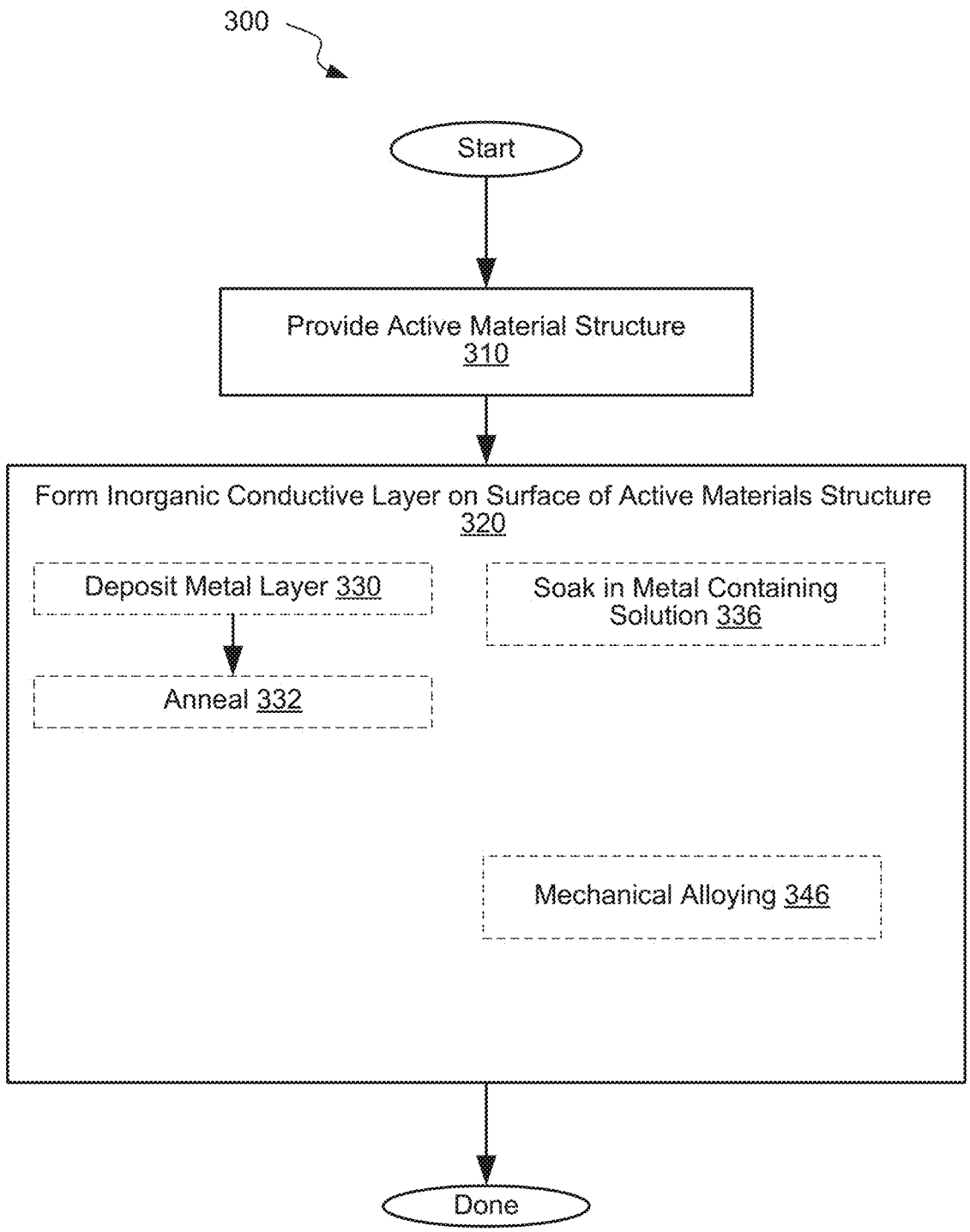
FIG. 3A is a process flowchart corresponding to a method of forming an active material component, in accordance with some examples.

FIG. 3A is a process flowchart of method 300, which may be used to form active material component 200, in accordance with some examples. As noted above, active material component 200 is a standalone component (e.g., physically separated) and may be used to form electrode 100 together with other active material components, as further described below with reference with FIG. 3B. For example, method 300 may produce multiple active material components 200 in a powder form. These components are later incorporated into slurry, coated over a current collector to form electrode. In some examples, inorganic conductive layer 150 is first combined with active material structure 140 while forming electrode 100. In these examples, method 300 is not performed and active material component 200 is not formed.

Referring to FIG. 3A, method 300 may commence with providing active material structure 140 during operation 310. Various examples of active material structure 140 are described above. Active material structure 140 may be provided in a powder form (e.g., together with other active material structures), supported on a substrate, and the like. In some examples, active material structure 140 may be pre-treated, such as oxidized, or etched to remove the oxide layer, or passivated with some functional coatings. In some examples, active material structure 140 have carbon containing layer 160 on the surface such that carbon containing layer 160 forms an interface between active material structure 140, which is formed later.

Method 300 may proceed with forming inorganic conductive layer 150 on at least a portion of the surface of active material structure 140 during operation 320. Various examples of inorganic conductive layer 150 are described above. Specifically, inorganic conductive layer 150 has an electronic conductivity of greater than $10^4$ S/m and provides an electronic path to and from active material structures 140.

In some embodiments, inorganic conductive layer 150 may be deposited in its final composition and form without any post-deposition processes. Some examples of deposition techniques include, but are not limited to, thermal chemical vapor deposition (CVD), plasmas-enhanced CVD, hot-wire CVD, metal-organic CVD, microwave CVD, sputtering, thermal evaporation, e-beam evaporation, solid-state reaction, sol-gel method, atomic layer deposition (ALD), hydrothermal reaction, ARC furnace and co-precipitation, electrochemical deposition, and the like. In some examples, a metal-containing precursor can be evaporated onto the active particles, and react (e.g., instantly) with the active particle surfaces to form a conformal coating on the active particles.

Alternatively, a process of forming inorganic conductive layer 150 may involve depositing a precursor layer on the surface of active material structure 140 and then converting this precursor layer into inorganic conductive layer 150. For example, referring to block 330 in FIG. 3A, active material structure 140 may comprise silicon and this structure may be first coated with a metal layer, e.g., nickel, titanium, copper, iron, molybdenum, zirconium, manganese, magnesium, tin, platinum, and calcium. Various examples if deposition techniques are listed above. In some examples, titanium (Ti) metal can be sputtered onto silicon (Si) particles. Titanium reacts with silicon around 500° C. in an inert atmosphere, such as argon, and forms a coherent $TiSi_2$ layer, which is much more conductive than the original Si material. The thickness of this metal coating may be between 0.001 micrometers and 500 micrometers or, more specifically, between 0.01 micrometers and 10 micrometers. Referring to block 332 in FIG. 3A, active material structure 140 with the metal layer may be then annealed to form inorganic conductive layer 150 comprising metal silicides. In some examples, metal silicides are formed in an inert atmosphere (such as argon) or in vacuum, at elevated temperatures close to or above the phase transformation temperatures (e.g., 500° C.) shown in a metal-silicon (M-Si) phase diagram. The deposition process may take between 1 minute and 60 minutes. This process may be referred to a self-aligned process. $TiSi_2$ formation on Si involves a self-aligned reaction that forms coherent interfaces, which ensures seamless transport of electrons and strong binding.

In some examples, referring to block 336 in FIG. 3A, active material structure 140 may be soaked in a metal-containing solution, such as a nickel-containing chemical bath made from a nickel-containing salt. One example of a suitable salt is nickel sulfate ($NiSO_4$). The process may take between 1 hour and 6 hours. In some examples, the process is performed at a room temperature (20-25° C.). One or more seeding agents may be used. Inorganic conductive layer 150 may be formed during this soaking operation. In some examples, the soaking operation is followed by an annealing operation.

In some examples, inorganic conductive layer 150 is formed using a metal-containing salt. In these examples, fine metal salt particles may be attached to the active Si particles, followed by heat treatment (e.g., annealing at 300° C.). During the heat treatment, the salt decomposes and metal silicide is formed.

In some examples, referring to block 346 in FIG. 3A, inorganic conductive layer 150 is formed using mechanical alloying between metal and silicon of active material structure 140. For instance, metal and silicon particles are mixed and ball milled for prolonged. durations (such as 1-12 hours) to promote solid-state reaction or alloying process between the metal and silicon particles. The process may be performed at the room temperature (20-25° C.). This process of forming inorganic conductive layer 150 is different from, for example, a process of loading a silicon powder into a metal foam, provided as a three dimensional matrix, and pressed to increase contact points, followed by annealing to promote reactions from these contact points.

In some examples, metal silicide powder is mixed with active silicon powder to form a composite. The starting powder comprises one or more silicides in these examples. For example, a fine metal silicide powder can be mixed with silicon particles having a larger size (than the silicide powder). Due to the bimodal size distribution, the finer silicide particles naturally decorate the larger silicide particles and fill the gaps in between. Other methods of forming inorganic conductive layer 150 are also within the scope.

Referring to examples, in which inorganic conductive layer 150 comprises silicides, formation of silicide may involve local redistribution of atoms at least on the surface of active material structure 140. As such, the process of forming inorganic conductive layer 150 may be used for controlling the porosity of active material structure 140, which, in turn, has an effect on mechanical integrity and permeability of active material structure 140. When forming a metal silicide (M-Si) using a self-aligned process, silicon particles serve as the silicon source. Depletion of the silicon on the surface changes the surface structure of silicon particles and/or porosity depending on the degree of silicide formation. Such changes in porosity and silicon surface, in turn, change how the active silicon particles interface with electrolyte. Furthermore, the porosity increase provides additional space for silicon to expand during lithiation. In some examples, the porosity increase is able to accommodate most or all of silicon expansion, which helps to preserve integrity of electrodes and improve cell cycle life.

In some examples, inorganic conductive layer 150 may be formed together with carbon containing layer 160. Examples of carbon containing layer 160 are described above with reference to FIG. 2E. For example, a metalorganic precursor may be introduced to the surface of inorganic conductive layer 150. The metal portion of metalorganic precursor may react with a material of inorganic conductive layer 150 (e.g., forming a metal silicide), while the organic portion of the precursor may decompose and form carbon containing layer 160.

Figure 3B:
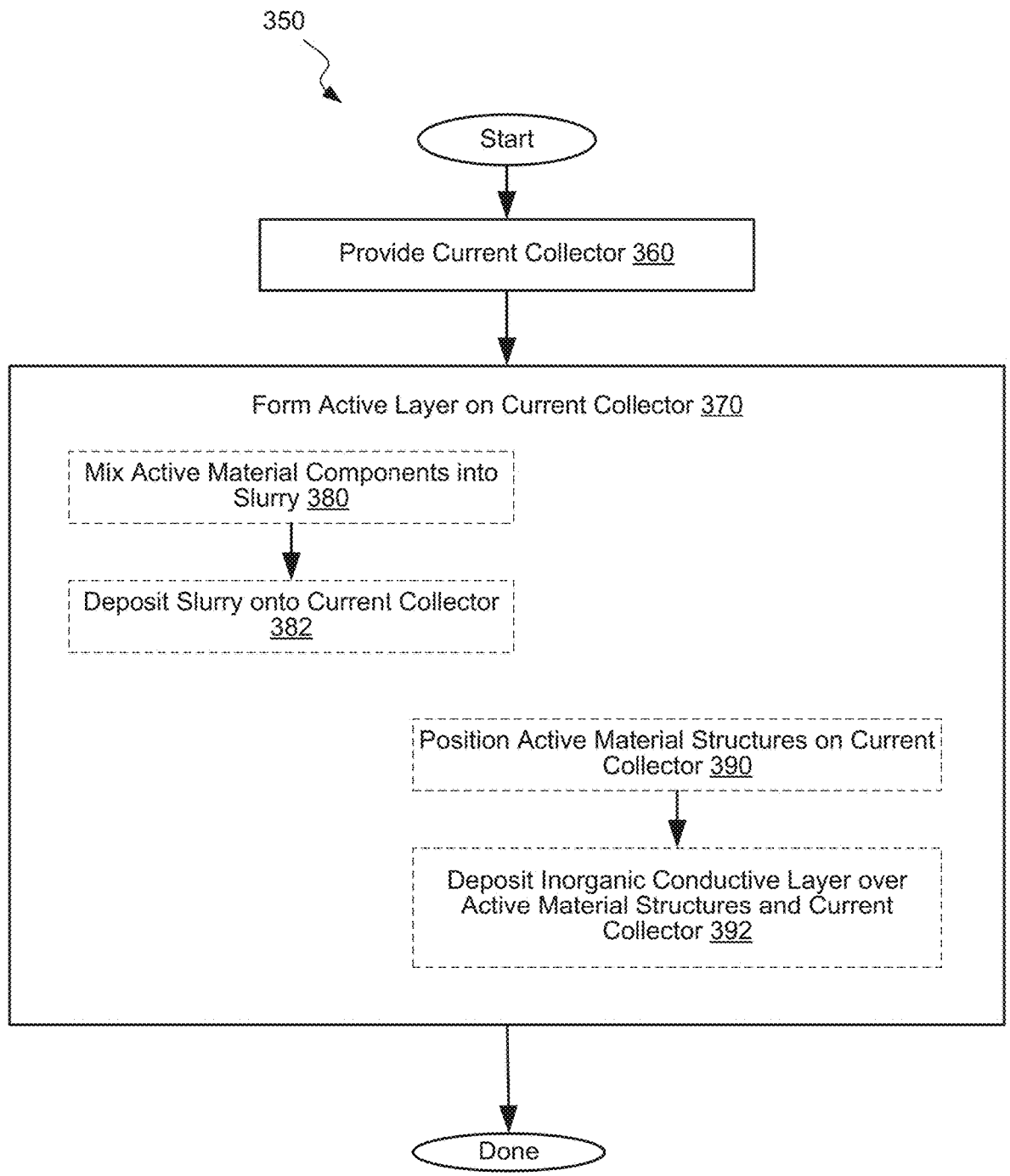
FIG. 3B is a process flowchart corresponding to a method of forming an electrode, in accordance with some examples.

FIG. 3B is a process flowchart of method 350 forming electrode 100, in accordance with some examples. Method 350 may commence with providing current collector 130 during operation 360. Various examples of current collector 130 are described above.

Method 350 proceeds with forming active layer 110 on current collector 130 during operation 370. Specifically, active layer 110 directly interfaces and disposed on current collector 130 as, for example, shown in FIG. 1A. Various examples of active layer 110 are described above.

In some examples, operation 370 comprises mixing active material components 200 into slurry (block 380 in FIG. 3B) and depositing the slurry onto current collector 130 (block 382 in FIG. 3B). For example, active material components 200 may be in a powder form and may be combined with a solvent, polymer binder, conductive additive, and/or other components to form the slurry. In these examples, active material components 200 may already have inorganic conductive layers 150. The process of forming such active material components 200 is described above with reference to FIG. 3A. After depositing the slurry, the slurry is dried to remove the solvent and, in some examples, to form direct connections among inorganic conductive layers 150 of active material components 200 and/or between inorganic conductive layers 150 and current collector 130. Because inorganic conductive layers 150 provide electronic conducting paths as well as the binding force between the active material particles and current collector, the use of a polymeric binder can be reduced or even eliminated. Therefore, the proportion of active materials in the electrode can be increased, which in turn help improve the energy density of an electrochemical cell.

In some examples, operation 370 comprises positioning active material structures 140 on current collector 130 (block 390 in FIG. 3B) and depositing inorganic conductive layer 150 over active material structures 140 and current collector 130 (block 392 in FIG. 3B).

In these examples, inorganic conductive layer 150 may interconnect active material structures 140 and current collector 130 while being deposited. In other words, the same continuous inorganic conductive layer 150 may extend over one or more active material structures 140 and the surface of current collector 130.

Various examples of forming inorganic conductive layer 150 are described above with reference to FIG. 3A.

Examples of Electrochemical Cells/Applications

Figure 4:
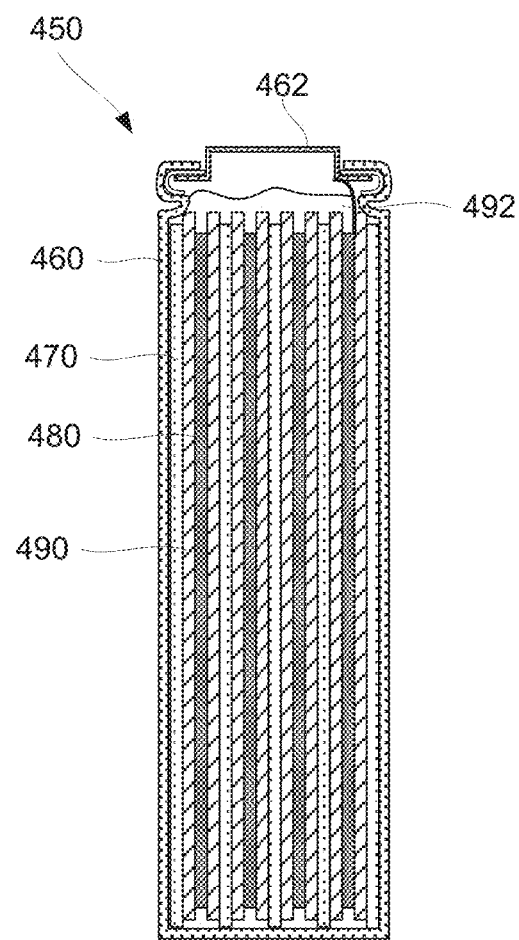
FIG. 4 is a schematic illustration of an electrochemical cell, in accordance with some examples.

FIG. 4 is a schematic illustration of electrochemical cell 450, comprising first electrode 470, second electrode 480, and separator 490 arranged in a stack, wound jelly-roll, or any form. Various examples of electrodes are described above. First electrode 470 and/or second electrode 480 may comprise active layer 110 (not specifically shown), comprising active material structures 140 and inorganic conductive layer 150, coating and binding together active material structures 140. Separator 490 is disposed between first electrode 470 and second electrode 480 to prevent direct contact between first electrode 470 and second electrode 480 yet allows ionic communication between these electrodes. Specifically, separator 490 may include pores allowing ions to pass. Electrochemical cell 450 also includes electrolyte 492, which operates as a carrier of ions during cycling of electrochemical cell 450. First electrode 470, second electrode 480 are enclosed by case 460 and lid 462. In some examples, case 460 and/or lid 462 may operate as terminals of electrochemical cell 450, in which case current collectors of first electrode 470 and/or second electrode 480 may be connected to case 460 and/or lid 462. Some examples of electrochemical cell 450 include, but are not limited to, lithium ion batteries, lithium polymer batteries, lithium air batteries, lithium sulfite batteries, lithium metal batteries, super capacitors, and the like.

In some examples, case 460 is rigid (e.g., the case is a steel can). Other types of cells may be packed into a flexible, foil-type (e.g., polymer laminate) case. The case material selection depends on polarity of case 460 (e.g., neutral, connected to positive electrodes, connected to negative electrodes) as well as the composition of electrolyte, operating potentials of electrochemical cell 450, and other like factors. For example, when case 460 is connected to a positive electrode, case 460 may be formed from titanium, titanium alloys, aluminum, aluminum alloys, and/or stainless steel. On the other hand, if case 460 is connected to a negative electrode, then case 460 may be made from titanium, titanium alloys, copper, nickel, lead, and stainless steels. The electrical connection between case 460 and an electrode may be established by a direct contact between case 460 and this electrode (e.g., an outer wound of the jelly roll), by a tab connected to the electrode and case 460, and other techniques.

The top of case 460 may be open and used for insertion of the electrode assembly (e.g., a jelly roll) and then capped with a header assembly, which may include a weld plate, a rupture membrane, a PTC-based reset table fuse, and an insulating gasket. The insulating gasket is used to support the conductive components of the header assembly and to insulate these components from case 460. In some examples, a PTC-based resettable fuse is disposed between edges of the rupture membrane and edges of the header cup, effectively interconnecting these two components. At normal operating temperatures, the resistance of PTC-based resettable fuse is low. However, its resistance increases substantially when heated. For example, the PTC-based resettable fuse may be a thermally activated circuit breaker that can electrically disconnect the rupture membrane from the header cup.

Types of electrochemical cells are determined by active materials used on positive and negative electrodes as well as composition of electrolyte. Some examples of positive active materials include Li ($M'_xM''_y$)$O_2$, where M' and M" are different metals (e.g., Li(Ni$_x$Mn$_y$)O$_2$, Li(Ni$_{1/2}$Mn$_{1/2}$)O$_2$, Li(Cr$_x$Mn$_{1-x}$)O$_2$, Li(Al$_x$Mn$_{1-x}$)O$_2$), Li(Co$_x$M$_{1-x}$)O$_2$, where M is a metal, (e.g., Li(Co$_x$Ni$_{1-x}$)O$_2$ and Li(Co$_x$Fe$_{1-x}$)O$_2$), Li$_{1-W}$(Mn$_x$Ni$_y$Co$_Z$)O$_2$, (e.g., Li(Co$_x$Mn$_y$Ni$_{(1-x-y)}$)O$_2$, Li(Mn$_{1/3}$Ni$_{1/3}$Co$_{1/3}$)O$_2$, Li(Mn$_{1/3}$Ni$_{1/3}$Co$_{1/3}$-xMg$_x$)O2, Li(Mn$_{0.4}$Ni$_{0.4}$Co$_{0.2}$)O$_2$, Li(Mn$_{0.1}$Ni$_{0.1}$Co$_{0.8}$)O$_2$, Li$_{1-W}$(Mn$_x$Ni$_x$Co$_{1-2x}$)O$_2$, Li$_{1-W}$(Mn$_x$Ni$_y$CoAl$_W$)O$_2$, Li$_{1-W}$(Ni$_C$Co$_Y$Al$_Z$)O$_2$ (e.g., Li(Ni$_{0.8}$Co$_{0.15}$Al$_{0.05}$)O$_2$), Li$_{1-W}$(Ni$_x$Co$_y$M$_Z$)O$_2$, where M is a metal, Li$_{1-W}$(Ni$_x$Mn$_y$M$_Z$)O$_2$, where M is a metal, Li(Ni$_{x-y}$Mn$_y$Cr$_{2-x}$)O$_4$, LiM'M"$_2$O$_4$, where M' and M'" are different metals e.g., LiMn$_{2-Y-Z}$Ni$_Y$O$_4$, LiMn$_{2-Y-Z}$Ni$_Y$Li$_Z$O$_4$, LiMn$_{1.5}$Ni$_{0.5}$O$_4$, LiNiCuO$_4$, LiMn$_{1-x}$Al$_x$O$_4$, LiNi$_{0.5}$T$_{0.5}$O$_4$, Li$_{1.05}$Al$_{0.1}$Mn$_{1.85}$O$_{4-z}$F$_z$, Li$_2$MnO$_3$) Li$_x$V$_y$O$_Z$, e.g., LiV$_3$O$_8$, LiV$_2$O$_5$, and LiV$_6$O$_{13}$.

Active materials may be deposited in active material layers and supported on conductive substrates. The conductive substrates not only provide mechanical support to the active material layers but also deliver electrical currents between the active material layers and battery terminals. Substrate materials may include copper, stainless steel, titanium, aluminum, nickel, chromium, tungsten, metal nitrides, metal carbides, carbon, carbon fiber, graphite, graphene, or combinations of above including multi-layer structures. Various considerations described above with reference to case materials also apply to substrate materials. In some examples, the substrate is a foil, films, mesh, laminate, or any other suitable configurations.

In some embodiments, a separator is disposed between a positive electrode and an adjacent negative electrode. Some example of separator material include poly(ethylene-co-tetrafluoroethylene (PETFE), poly(ethylenechloro-co-trifluoroethylene), polystyrenes, polyvinyl chlorides polypropylene, polyethylene, polyamides, polyimides, polyacrylics, polyacetals, polycarbonates, polyesters, polyetherimides, polyimides, polyketones, polyphenylene ethers, polyphenylene sulfides, glass fiber materials, ceramics, and a polypropylene membrane.

The electrolyte provides ionic communication between positive and negative electrodes in the cell. The electrolyte may be liquid, solid, or gel. A liquid electrolyte may include one or more solvents and one or more lithium-containing salts. Some solvent examples include cyclic carbonates (e.g., ethylene carbonate (EC), propylene carbonate (PC), butylene carbonate (BC) and vinylethylene carbonate (VEC)), lactones (e.g., gamma-butvrolactone (GBL). gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), and amides (e.g., dimethyl formamide). Some examples of salts include LiPF$_6$, LiBF$_4$, LiClO$_4$ LiAsF$_6$, LiN(CF$_3$SO$_2$)$_2$, LiN(C$_2$F$_5$SO$_2$)$_2$, LiCF$_3$SO$_3$, LiC(CF$_3$SO$_2$)$_3$, LiPF$_4$(CF$_3$)$_2$, LiPF$_3$(C$_2$F$_5$)$_3$, LiPF$_3$(CF$_3$)$_3$, LiPF$_3$(iso-C$_3$F$_7$)$_3$, LiPF$_5$(iso-C$_3$F$_7$), lithium salts having cyclic alkyl groups (e.g., (CF$_2$)$_2$(SO$_2$)$_{2x}$Li and (CF$_2$)$_3$(SO$_2$)$_{2x}$Li), and combination of thereof. The total concentration of one or more salts in the electrolyte is at least about 0.3 M or, more specifically, at least about 0.7M.

Experimental Examples

Figure 5:
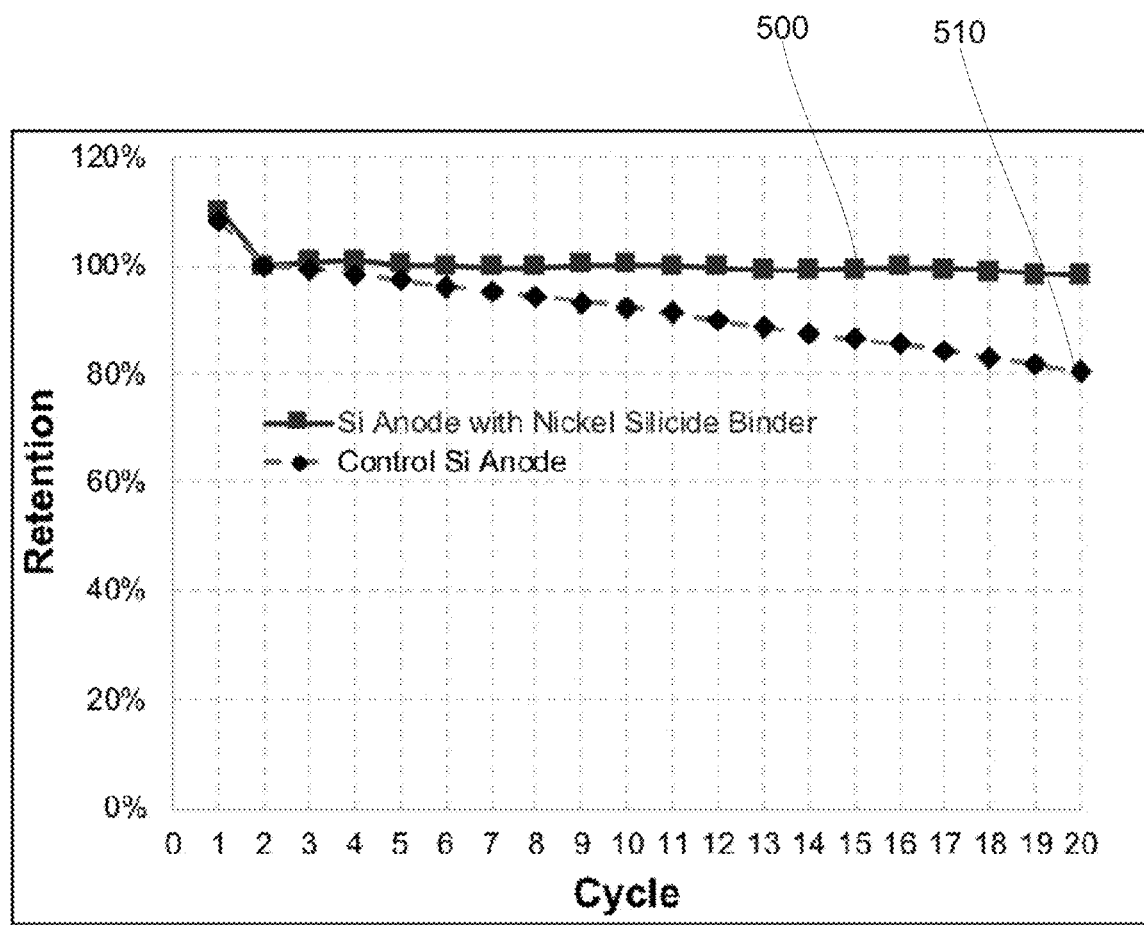
FIG. 5 illustrates experimental results showing improved cycle life of an electrochemical cell fabricated with a nickel silicide layer operable as a conductive binder vs. an electrochemical cell fabricated with a conventional polymer binder.

FIG. 5 illustrates experimental results showing improved cycle life of an electrochemical cell fabricated with a silicon active material and a nickel silicide binder (line 500) vs. an electrochemical cell fabricated with a silicon active material and a conventional polymer binder (line 510). Both cells used $LiNi_{0.6}Mn_{0.2}Co_{0.2}O_2$ (NMC) as a positive active material and tested using a voltage range of 2.8 to 4.25 V at 0.5 C rate. A nickel silicide binder was formed through annealing of silicon particles with deposited nickel coatings on the surfaces of the silicon particles. After forming the nickel silicide binder, the particles were mixed into slurry and coated onto a current collector using a process similar to the oner described above. No additional conductive additives (such as Super-P carbon) were added into the slurry. The control cells were prepared with bare silicon active particles (i.e., without any nickel silicide coating). An SBR binder was used for the cells.

The cell with the nickel silicide binder exhibited much better cycle life/capacity retention than the cell with the conventional polymer binder. For example, after 20 cycles, the capacity of the cell with the nickel silicide binder was close to 99%, while the capacity of the cell with the conventional polymer binder dropped to 80%. It should be noted that without a conductive additive (e.g., Super-P carbon), bare Si electrodes typically demonstrate very fast capacity fading.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

The invention claimed is:

1. An electrode for use in an electrochemical cell, the electrode comprising:
   a current collector;
   an active layer, directly interfacing and disposed on the current collector, the active layer comprising:
      multiple active material structures spaced apart from each other; and
      an inorganic conductive layer, coating and binding together the multiple active material structures, wherein:
         the inorganic conductive layer extends among different ones of the multiple active material structures and provides electronic pathways among the different ones of the multiple active material structures,
         the inorganic conductive layer blocks a surface of the multiple active material structures from environment, and
         the inorganic conductive layer has an electronic conductivity of greater than $10^4$ S/m and provides an electronic path among the multiple active material structures.

2. The electrode of claim 1, wherein the inorganic conductive layer comprises one of a silicide selected from the group consisting of nickel silicide, titanium silicide, copper silicide, iron silicide, molybdenum silicide, zirconium silicide, manganese silicide, magnesium silicide, tin silicide, platinum silicide, and calcium silicide.

3. The electrode of claim 1, wherein the inorganic conductive layer comprises a semi-liquid metal.

4. The electrode of claim 1, wherein the multiple active material structures comprises a material selected from the group Li, Si, Sn, Ge, Al, SnO2, TiO2, and $TiSi_2$(C49).

5. The electrode of claim 1, wherein the multiple active material structures comprise $TiSi_2$ (C49), and wherein the inorganic conductive layer comprises $TiSi_2$ (C54).

6. The electrode of claim 1, wherein the inorganic conductive layer directly interfaces the current collector and provides an electronic path between the multiple active material structures and the current collector.

7. The electrode of claim 6, wherein the inorganic conductive layer and the current collector are connected with chemical bonds.

8. The electrode of claim 6, wherein the inorganic conductive layer adheres the multiple active material structures to the current collector.

9. The electrode of claim 1, wherein the active layer further comprises a conductive additive.

10. The electrode of claim 1, wherein the active layer further comprises a polymer binder.

11. The electrode of claim 1, wherein the inorganic conductive layer fully covers a surface of the multiple active material structures.

12. The electrode of claim 1, wherein the inorganic conductive layer only partially covers a surface of the multiple active material structures.

13. The electrode of claim 1, wherein the inorganic conductive layer consists essentially of a silicide.

14. The electrode of claim 1, wherein the inorganic conductive layer forms chemical bonds with the multiple active material structures.

15. The electrode of claim 1, wherein each of the inorganic conductive layer and the multiple active material structures comprises silicon.

16. An active material component, for forming an electrode of an electrochemical cell, the active material component comprising:
    multiple active material structures spaced apart from each other; and
    an inorganic conductive layer, coating and binding together the multiple active material structures, wherein:
       the inorganic conductive layer extends among different ones of the multiple active material structures and provides electronic pathways among the different ones of the multiple active material structures,
       the inorganic conductive layer blocks a surface of the multiple active material structures from environment, and
       the inorganic conductive layer has an electronic conductivity of greater than $10^4$ S/m and provides an electronic path to and from the multiple active material structures.

17. The active material component of claim 16, wherein the active material component is a standalone component, forming a powder with other active material components.

18. The active material component of claim 16, wherein the inorganic conductive layer fully covers a surface of the multiple active material structures.

19. The active material component of claim 16, wherein the inorganic conductive layer is conformal.

20. The active material component of claim 16, wherein the inorganic conductive layer comprises one of a silicide selected from the group consisting of nickel silicide, titanium silicide, copper silicide, iron silicide, molybdenum silicide, zirconium silicide, manganese silicide, magnesium silicide, tin silicide, platinum silicide, and calcium silicide.

* * * * *